United States Patent [19]
Bonnemay

[11] Patent Number: 4,591,719
[45] Date of Patent: May 27, 1986

[54] APPARATUS FOR MEASURING THE LEVEL OF A LIQUID IN AN ENCLOSURE

[75] Inventor: Alain Bonnemay, Orsay, France

[73] Assignee: Commissariat a l'Energie Atomique, France

[21] Appl. No.: 505,199

[22] Filed: Jun. 17, 1983

[30] Foreign Application Priority Data

Jun. 24, 1982 [FR] France ................. 82 11078

[51] Int. Cl.$^4$ ................. G01T 23/10; G01F 23/00
[52] U.S. Cl. ................. 250/357.1; 378/52
[58] Field of Search ................. 250/357.1, 308, 394; 378/52, 51

[56] References Cited

U.S. PATENT DOCUMENTS

| | | | |
|---|---|---|---|
| 3,100,841 | 8/1963 | Reider | 378/52 |
| 3,160,745 | 12/1964 | Foster | 378/51 |
| 3,594,575 | 7/1971 | Shoemaker | 378/52 |
| 3,617,735 | 11/1971 | Shoemaker | 378/52 |
| 4,268,753 | 5/1981 | Murakami et al. | 378/52 |
| 4,369,368 | 1/1983 | Bernard et al. | 250/357.1 |

FOREIGN PATENT DOCUMENTS 25389 3/1981 European Pat. Off. .
1179729 10/1964 Fed. Rep. of Germany .

*Primary Examiner*—Carolyn E. Fields
*Attorney, Agent, or Firm*—Handal & Morofsky

[57] ABSTRACT

Apparatus for measuring the level of water in an enclosure.

It comprises an assembly, which is constituted by a radiation source located in the vicinity of the enclosure wall, and n radiation detectors separated from the radiation source by a path traversing the enclosure and located at different levels on a same vertical line. After amplification, each detector supplies a signal proportional to the intensity of the radiation received. It comprises means for processing the signals supplied by the detectors, said means being constituted by n−1 dividing circuits, the detectors being connected in pairs to a dividing circuit, which forms the quotient $\mu_1/\mu_{i+1}$, the level then being located in the gap between the detectors, for which the quotient $\mu_i/\mu_{i+1}$ is maximum.

10 Claims, 7 Drawing Figures

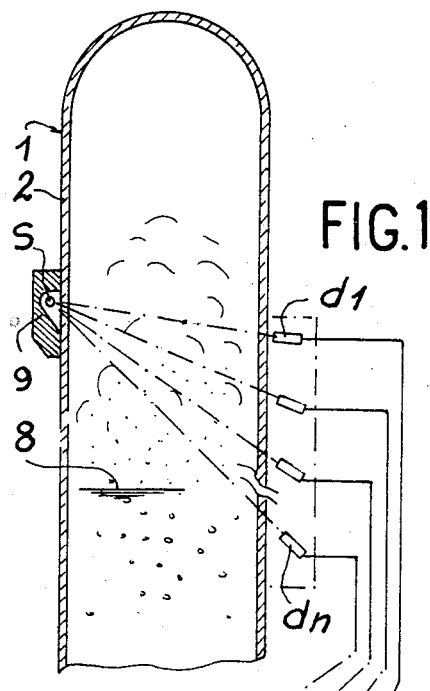
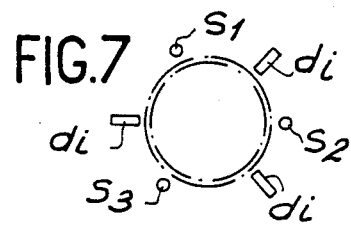
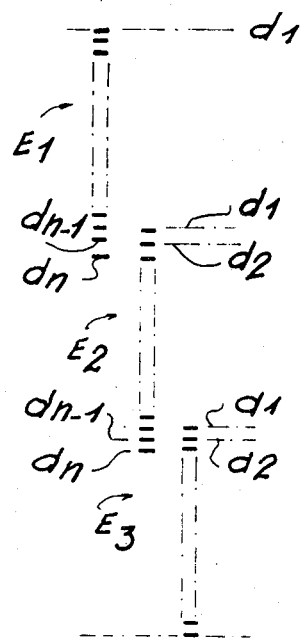
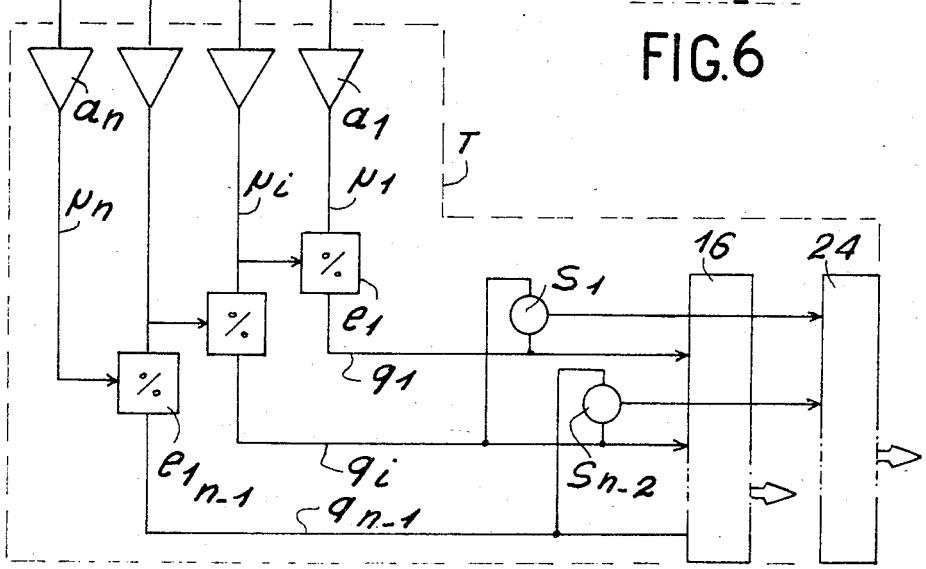

APPARATUS FOR MEASURING THE LEVEL OF A LIQUID IN AN ENCLOSURE

BACKGROUND OF THE INVENTION

The invention relates to an apparatus for measuring the level of a liquid in an enclosure. It is more particularly applicable to measuring the level of the liquid water contained in the pressurizer of a pressurized water nuclear reactor (PWR reactor).

In PWR reactors, a high pressure is maintained in the primary circuit by a pressurizer constituted by a sealed enclosure in which the pressure of the primary circuit is maintained by equilibrium between the liquid phase and the gaseous phase of the water.

Numerous apparatuses are known, which make it possible to measure the liquid phase level in the pressurizer, e.g. measuring devices using the pressure difference. However, these known apparatuses cause problems of representativeness (hysteresis, variations, readjustments). Moreover, the transition between the liquid phase and the vapour phase is not always clearly defined. In certain cases, there is an intermediate two-phase area, with vapour bubbles in the liquid water. A pressure difference device does not make it possible to detect such a situation. It is for this reason that level measuring apparatuses based on the absorption variations of a radiation, when said radiation passes through media of different natures, have been the subject of considerable interest. Thus, apparatuses for measuring the water level in a pressurizer by means of one or more radiation sources disposed in the vicinity of the enclosure wall and one or more radiation detectors receiving the radiation having traversed the enclosure are known. The measurement of the signal received is then used for deducing the level of the surface of the liquid and/or the local density of the two-phase mixture.

For example, French Patent Application No. 79 22218, filed on September, 1979, in the name of the Commissariat à l'Energie Atomique and entitled: "Process and apparatus for measuring the level of a liquid in an enclosure" describes an apparatus of this type, in which the result of the measurements is compared with a library of preestablished curves and relating to the different possible two-phase configurations.

However, this apparatus has the disadvantage of not permitting a direct and rapid measurement, because it requires the comparison of axial measurement maps with a library of preestablished curves. Moreover, it requires a high radiation source of approximately 1000 Ci, which causes radiation protection problems.

Finally, for distinguishing the radiation from the source from that of the activated water and that of the active deposits appearing on the walls, it is necessary to have a supplementary detector, positioned in such a way that it is not exposed to the radiation from the sources, which makes it possible to correct in the total counting rate, that part which is due to the activity of the water and the deposits.

SUMMARY OF THE INVENTION

The present invention relates to an apparatus for measuring the level of the water in an enclosure applicable in the case of a radioactive enclosure, which obviates these difficulties by processing the signals received by the radiation detectors.

More specifically, the present invention relates to an apparatus for measuring the level of a liquid in an enclosure comprising an assembly formed by a radiation source positioned in the vicinity of the enclosure wall, and n radiation detectors, separated from the radiation source by a path traversing the enclosure and located at different levels on the same vertical line, each detector $d_i$ supplying, after amplification, a signal $\mu_i$ which is proportional to the radiation intensity received, wherein the apparatus comprises means for processing the signal supplied by the detectors, said means being constituted by $n-1$ dividing circuits, the detectors $d_i$, $d_{i+1}$ being connected in pairs to a dividing circuit which produces the quotient $\mu_i/\mu_{i+1}$, the level then being located in the gap between detectors $d_i$ and $d_{i+1}$ for which the quotient $\mu_i/\mu_{i+1}$ is maximum.

In this way, $n-1$ signals are obtained. It is possible to prove that one of these signals is much larger than the others and that the peak obtained characterizes the water level in the pressurizer encosure. More specifically, the level is located between the two radiation detectors for which the peak value has been obtained.

Moreover, the signals obtained are independent of the intensity of the radiation source, so that there is no need to carry out any measurement of the latter and the variation in time of this source or the radiation absorptions permitted by it have no influence.

Thus, the measurement of the level is directly obtained, without it being necessary to compare the measurements of sensors with preestablished curves, and without it being necessary to use a supplementary sensor for taking account of the activity of the water.

In addition, the measurement is obtained almost instantaneously, which makes it possible to follow level variations in real time. According to a preferred embodiment, the apparatus according to the invention comprises $n-2$ subtracting circuits, the signals $q_i$, $q_{i+1}$ from the two dividing circuits being introduced into a subtracting circuit which forms the difference $q_i - q_{i+1}$, the high and low limits of the two-phase layer then being located in the two gaps between detectors $d_i$ and $d_{i+1}$ for which the signals $s_i$ have two opposite extremes.

Preferably, a device for collimating the radiation which has passed through the enclosure is placed between the enclosure wall and each of the said radiation detectors. The function of this collimator is to reduce the contribution of stray radiation from the activated water and the radioactive corrosive products deposited on the walls. The use of collimators makes it possible to increase the amplitudes of the peaks observed and consequently reduce the intensity of the radiation source.

Finally, in the case where the height of the enclosure is significant, it is possible to provide several superimposed measuring apparatuses, which are oriented in accordance with secant planes and are heightwise positioned in such a way as to obtain a partial overlap of the zones monitored by each of them. In this case, it is indispensable to have a device for collimating the radiation received by the detectors.

BRIEF DESCRIPTION OF THE DRAWINGS

The invention is described in greater detail hereinafter relative to non-limitative embodiments and with reference to the attached drawings, wherein show:

FIG. 1 a diagrammatic sectional view of a PWR reactor pressurizer, equipped with a water level measuring apparatus according to the invention.

FIGS. 6 and 7 diagrammatically, a longitudinal sectional and a cross-section of a pressurizer equipped with a water level measuring apparatus adapted to the case of a very high enclosure.

DETAILED DESCRIPTION OF THE INVENTION

Figure 2:
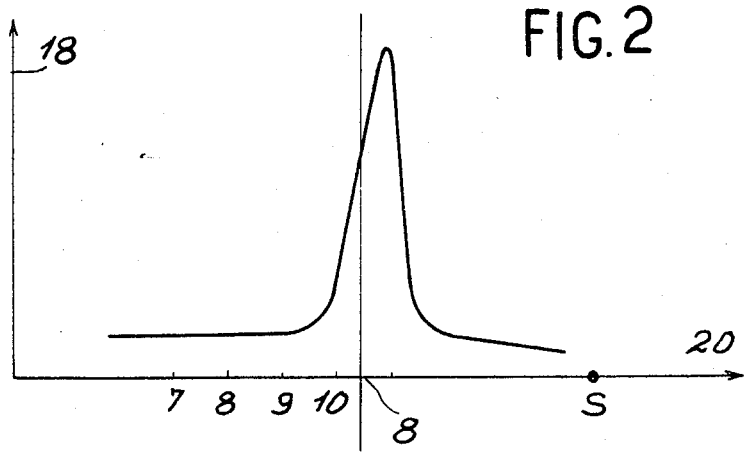
FIG. 2 a curve of the signals from dividers forming part of the apparatus of FIG. 1.

FIG. 1 is a diagrammatic sectional view of a PWR reactor pressurizer, equipped with a water level measuring apparatus according to the invention.

Pressurizer 1 is in the form of a vertical cylinder having a diameter of approximately 2 m and a height of approximately 12 m. Within it, the water and vapour are in thermodynamic equilibrium at a temperature equal to the saturation temperature corresponding to a nominal pressure of the primary circuit. The function of the pressurizer is to maintain this pressure substantially constant during temporary charge or load conditions. This is carried out by heating or cooling systems. The pressure is increased by vaporizing the water and decreased by condensing the vapour.

The function of the apparatus according to the invention is to measure the water level in pressurizer 1, which makes it possible to obtain an instantaneous measurement and follow variations in level 8.

The apparatus comprises a source S, located in the vicinity of the pressurizer wall 2 and outside said pressurizer. Source S is located within a lead container 9, which protects the external environment against the emitted radiation. For example, source S is a gamma source with an intensity of 200 Ci.

Also outside wall 2 and diametrically opposite to source S, there are n radiation detectors $d_1$ to $d_n$. The detectors are located on the same vertical generatrix and are arranged equidistantly. In the presently described embodiment, there are 18 sensors with a 20 cm spacing. Thus, the apparatus makes it possible to monitor the level of liquid 8 over a height of 3.4 m. The detectors are numbered from that located closest to source S. Preferably, source S is 50 cm above the highest detector, i.e. detector $d_1$ and the mean angle of the beam with the horizontal plane is approximately 40°. These conditions make it possible to optimize the useful signal. The source S and the n detectors associated therewith form assembly E.

Each detector $d_1$ is connected to an amplifier $a_1$, which amplifies the signals received by this detector. The gains of amplifiers $a_1$ are substantially equal, when the detectors are equidistant. However, the latter may not be equidistant. In this case, a relative modification of the different gains would make it possible to reconstitute the correct operation of the apparatus. Following amplification, these signals are passed into a dividing circuit $e_i$, which forms the quotient of the signal from detector $d_i$ by the signal from detector $d_{i+1}$. The quotient $q_i$ is passed to operator 16, which determines the index of the detector corresponding to the highest value of quotient $q_i$. Finally, operator 16 displays this information for the user.

Operator 16 can have a maximum determination circuit, e.g. a maximum detector, or a series of threshold comparison circuits, each associated with a dividing circuit $e_i$, and a display device, e.g. a series of indicator lights, whereof one is covered to indicate the level under the control of the maximum determination circuit. In a simplified version, each dividing circuit $e_i$ is associated with a measuring apparatus and the user determines the signal maximum with the naked eye.

The response speed of the apparatus is a few dozen microseconds. It makes it possible to instantaneously follow water level variations.

It should also be noted that there is no need to provide a collimator between source S and each of the radiation detectors.

FIG. 2 shows a curve giving the amplitude 18 of quotients $q_1$ to $q_{17}$ emitted by each of the dividing circuits. Thus, there are 18 radiation detectors $d_1$ to $d_{18}$, but only 17 dividing circuits corresponding to each of the 17 20 cm segments in which the height to be monitored, which is 3.40 m, is subdivided.

As can be gathered from FIG. 2, the maximum amplitude signal corresponds to dividing circuit $e_{11}$. Thus, the level of the liquid is between detector $d_{10}$ and detector $d_{11}$.

Preferably, the apparatus according to the invention has $n-2$ subtracting circuits, designated $s_1$ to $s_{n-2}$. The quotients $q_1$ to $q_{n-1}$ from the $n-1$ dividers $e_1$ to $e_{n-1}$ are subtracted in pairs. In this way, the difference $q_i - q_{i+1} = t_i$ is obtained. Each of these differences $t_1$ is introduced into an operator 24, identical to operator 16.

Figure 3:
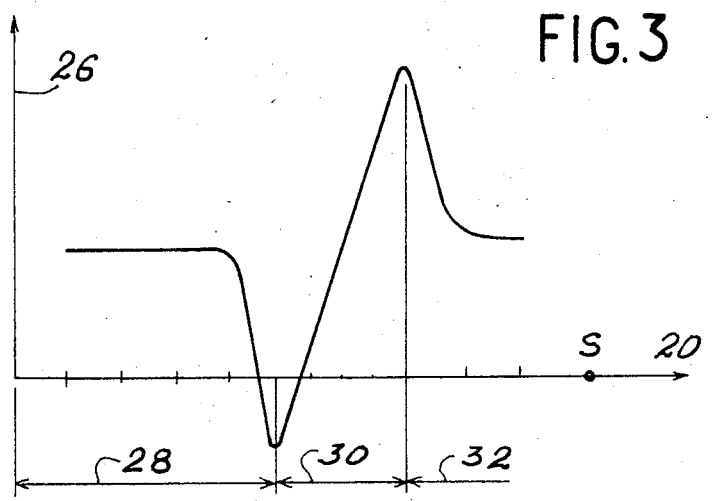
FIG. 3 a curve of the signals from subtractors forming part of the apparatus of FIG. 1.

FIG. 3 shows the amplitude 26 of signals $t_i$ as a function of the vertical distance 20. As can be seen, the signals $t_i$ have two opposite peaks, whose detection makes it possible to locate the two-phase layer. The zone 28 corresponds to the liquid water and zone 30 to the two-phase layer, whose lower part is formed by the vapour bubbles present in the water and whose upper part is formed by water droplets in the vapour. Zone 32 represents the vapour.

In order to increase the sensitivity of the measuring apparatus described hereinbefore, it is possible, although this is not indispensable, to place a collimator between source S and each of the radiation detectors $d_i$. The presence of a collimator permits a better discrimination of the radiation from the activated water and the radioactive deposits on the enclosure walls 2. Thus, the peaks shown in FIGS. 2 and 3 are more prominent.

Figure 4:
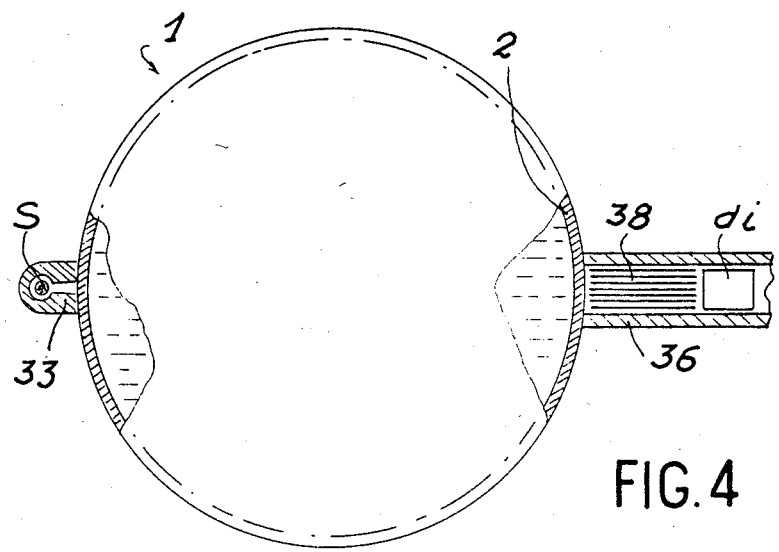
FIGS. 4 and 5 a longitudinal sectional view and an end view of a device for collimating the radiation received by the detectors.
Figure 5:
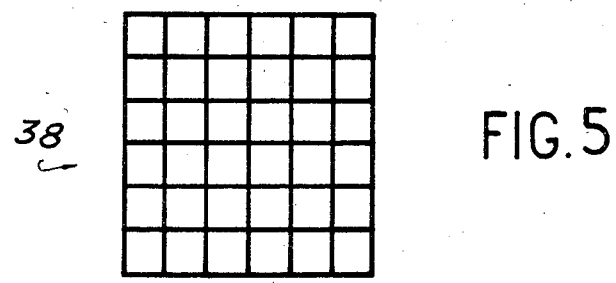

FIGS. 4 and 5 show a collimator, which can be used with the invention. FIG. 4 is a cross-section through pressurizer 1 passing through source S and a collimator 38. The lead shielding 33 ensures the necessary biological protection, but as can be seen in the vertical direction in FIG. 1, the opening angle is sufficiently open to enable the radiation emitted by the source to reach each of the detectors and the source is not far from the pressurizer wall. No collimation is necessary in the horizontal direction, unlike in the case of the French Patent Application referred to hereinbefore, which makes it possble to reduce the overall dimensions of the shielding.

Detector $d_i$ is located on the same diameter of pressurizer 1. This detector can be a sodium iodide scintillator and is located in shielding 36. Between detector $d_i$ and wall 2, there is a collimator 38, formed by metal plates parallel to the incident radiation, i.e. directed towards source S and whose section can e.g. be in grid form. This grid is constituted by a system of metal sheets, as can be seen in FIG. 5. For example, the spacing of the sheets is 1 cm, but the length of the collimator 38 does not have to be as great as in the case of French Patent Application No. 79 22218. For example, it can be 50 cm, which makes it possible to reduce the overall dimensions of the apparatus.

When the level variations are to be monitored over a significant height, it is possible to provide several apparatuses like that described with reference to FIGS. 1 to 5. They are superimposed, in the manner diagrammatically shown in FIGS. 6 and 7. FIG. 6 is a diagrammatic longitudinal sectional view of a pressurizer 1 having three superimposed assemblies $E_1$, $E_2$, $E_3$. FIG. 7 is a cross-section through pressurizer 1, which shows that each of these assemblies $E_1$ to $E_3$ is disposed in a secant diametral plane. This arrangement serves to ensure that the radiation emitted by a source, e.g. source $S_1$, does not reach the radiation detectors of a different assembly.

In FIG. 7, the planes which contain assemblies $E_1$ to $E_3$ are at 120° from one another. However, this arrangement is only preferred. The angle of the planes does not influence the accuracy of the measurements from the moment when these planes are secant.

The signals from the detectors of each of the assemblies $E_1$ to $E_3$ are processed by transmitted signal processing means $T_1$ to $T_3$, identical to those described with reference to FIGS. 1 to 3. The signals from each detector $d_i$ are amplified by an amplifier circuit $a_i$. The signals $\mu_i$ are introduced in pairs into a dividing circuit $e_i$, which forms the quotient $\mu_i/\mu_{i+1}$. These quotients $q_i$ are introduced at operator 16, which extracts the highest level signal corresponding to the water level in the pressurizer. Moreover, these signal processing means are preferably supplemented by $n-2$ subtracting circuits, which form the differences $t_i = q_i - q_{i+1}$. These differences are introduced into an operator 24, which extracts the two opposite peak values defining a zone corresponding to the two-phase layer.

In the described embodiment, each assembly E has 18 radiation sensors. To make it possible to follow the level variations without any discontinuity, there is a partial overlap of the areas monitored by assemblies $E_1$ and $E_2$ on the one hand, and assemblies $E_2$ and $E_3$ on the other. The overlap areas can consist of two detectors, as shown in FIG. 6, or possibly three detectors. Detectors $d_{n-1}$ and $d_n$ of assembly $E_1$ are located at the same vertical heights as detectors $d_1$ and $d_2$ of assembly $E_2$. However, their position in a horizontal plane differs, as is shown in FIG. 7. The same applies in the case of the overlap area of assemblies $E_2$ and $E_3$. Detectors $d_{n-1}$ and $d_n$ of assembly $E_2$ are located at the same vertical heights as detectors $d_1$ and $d_2$ of assembly $E_3$.

This overlap makes it unnecessary to take account of intensity differences between the sources of the different assemblies. Thus, in the case of the apparatus according to the invention, such intensity differences are liable to produce spurious peaks with a size comparable to the useful peaks.

It is pointed out that in the case of the apparatus described with reference to FIGS. 6 and 7, the presence of collimators, e.g. like that described with reference to FIGS. 4 and 5, is indispensable. Thus, it is necessary that the radiation detectors of one assembly are not influenced by the radiation source of another assembly. Consequently, whereas in the case of the embodiment of FIG. 1, the presence of collimators was only preferred, it is indispensable here.

In the preceding description, it has been stated that the radiation detectors are diametrically opposite to the radiation source with which they are associated. This arrangement is preferred, because it minimizes the effect of absorption by the walls of the radiation from the sources and it leads to the best possible averaging out of level disturbances. It is particularly recommended in the case of PWR pressurizers which, having to withstand high pressures, have a thick wall and in which the transition between the liquid phase and the vapour phase is not clearly defined. However, any other arrangement is possible and does not prejudice the operation according to the invention.

What is claimed is:

1. An apparatus for measuring the level of a liquid in an enclosure comprising a radiation source positioned in the vicinity of the enclosure wall, a number n of radiation detectors, where n is equal to or greater than three, said radiation source being positioned above said detectors, said radiation detectors supplying signals and said radiation detectors being separated from said radiation source by paths traversing the enclosure and being located at different levels on the same vertical line, each detector $d_i$ supplying, after amplification, a signal $u_i$ which is proportional to the radiation intensity received, processor means for processing said signals supplied by said detectors, said processor means comprising $n-1$ dividing circuits, means for connecting detectors $d_i$ and $d_{i+1}$ in pairs to a dividing circuit which acts as quotient means for producing the quotient $u_i/u_{i+1}$, and indicator means for indicating the level at the gap between those detectors $d_i$ and $d_{i+1}$ for which the quotient $u_i/u_{i+1}$ is the maximum.

2. An apparatus according to claim 1, wherein the radiation detectors are diametrically opposite to the radiation source.

3. An apparatus according to claim 1, wherein the radiation detectors are positioned equidistantly from one another.

4. An apparatus according to claim 1, wherein each radiation detector has a collimator oriented towards the radiation source.

5. A measuring apparatus, according to claim 4, wherein a plurality of assemblies, each formed by a radiation source and by associated radiation detectors, are oriented in accordance with secant planes, and positioned in height to obtain a partial overlap of the areas monitored by each assembly.

6. An apparatus according to claim 5, wherein an overlap area involves two or three detectors located at the same horizontal height.

7. An assembly according to claim 1, wherein the mean angle of the source—detector paths is 40° relative to the horizontal plane.

8. An apparatus as in claim 1, wherein said detectors are positioned to measure the water level in a pressurized water nuclear reactor.

9. An apparatus as in claim 8, wherein the signal $u_i$ is a function of the radiation path in water and in a gas disposed over said water.

10. An apparatus for measuring the level of a liquid in an enclosure comprising a radiation source positioned in the vicinity of the enclosure wall, a number n of radiation detectors, said radiation detectors supplying signals and said radiation detectors being separated from said radiation source by paths traversing the enclosure and being located at different levels on the same vertical line, each detector $d_i$ supplying, after amplification, a signal $u_i$ which is proportional to the radiation intensity received, processor means for processing said signals supplied by said detectors, said processor means comprising $n-1$ dividing circuits, means for connecting detectors $d_i$ and $d_{i+1}$ in pairs to a dividing circuit which acts as quotient means for producing the quotient $u_i/u_{i+1}$, and indicator means for indicating the level at the gap between those detectors $d_i$ and $d_{i+1}$ for which the quotient $u_i/u_{i+1}$ is the maximum, wherein the liquid may have a two-phase layer and wherein said indicator means comprises $n-2$ subtracting circuits coupled to said quotient means for developing signals $s_i$, the signals $q_i$, $q_{i+1}$ from two respective dividing circuits being introduced into a subtracting circuit which forms the difference $q_i - q_{i+1}$, to define the high and low limits of the two-phase layer in the two gaps between detectors $d_i$ and $d_{i+1}$ for which the signals $s_i$ have two opposite extremes.

* * * * *